United States Patent [19]
Gaylor

[11] 3,869,267
[45] Mar. 4, 1975

[54] EXHAUST GAS FILTER

[76] Inventor: Josephine Gaylor, 203 Almenter, Rock Hill, Mo. 63119

[22] Filed: Sept. 4, 1973

[21] Appl. No.: 394,173

[52] U.S. Cl............ 55/492, 55/359, 55/505, 55/509, 55/527, 55/DIG. 30
[51] Int. Cl............................ B01d 39/06
[58] Field of Search ............ 55/276, 504, 505, 506, 55/507, 527, 528, 522, 564, 478, 480, 181, DIG. 30, 515, 359, 512, 513, 518, 490, 491, 492, 509, 482; 60/309, 311; 180/54 A; 181/33 HB, 36 E, 50, 42; 210/485, 496

[56] References Cited
UNITED STATES PATENTS

| | | | |
|---|---|---|---|
| 1,531,096 | 3/1925 | Hoffman | 55/480 |
| 2,301,529 | 11/1942 | Fagan | 55/518 |
| 2,505,175 | 4/1950 | Davis | 55/491 |
| 2,524,588 | 10/1950 | Bechtel | 55/505 |
| 2,537,217 | 1/1951 | Farr | 55/491 |
| 2,747,684 | 5/1956 | Lewis, Sr. et al. | 55/519 |
| 2,846,022 | 8/1958 | Hubbard | 55/491 |
| 2,852,095 | 9/1958 | De Corious et al. | 55/513 |
| 3,360,120 | 12/1967 | Getzin | 55/359 |
| 3,406,501 | 10/1965 | Watkins | 23/288.5 |
| 3,638,402 | 2/1972 | Thomas | 21/74 R |
| 3,757,892 | 9/1973 | Raudman, Jr. | 55/276 |
| 3,771,365 | 11/1973 | Schempp | 55/518 |

FOREIGN PATENTS OR APPLICATIONS

| 6,972 | 11/1915 | Great Britain | 55/DIG. 30 |
|---|---|---|---|

Primary Examiner—Frank W. Lutter
Assistant Examiner—David L. Lacey

[57] ABSTRACT

This exhaust gas filter includes a cylindrical body formed from a fibrous filter material which is supported by a central core member attached to a base member. The body is adapted for insertion into an automobile tail pipe and the filter is attached to the tail pipe by means of a clamp provided by the base member. A removable cellephane cover is provided to facilitate installation and handling.

4 Claims, 5 Drawing Figures

PATENTED MAR 4 1975 3,869,267

EXHAUST GAS FILTER

BACKGROUND OF THE INVENTION

This invention relates generally to exhaust gas filters and particularly to a filter adapted for insertion into the tail pipe of an automobile exhaust system.

Several attempts have been made to provide a suitable pollution control filter device for an automobile exhaust so that particulate contaminants can be removed from the exhaust gases before they pass into the atmosphere.

Known filters are either provided as an attachment to the tail pipe or are provided in the muffler stage of the exhaust system. They tend in both cases to block the system and cause back-up pressures which adversely affect engine performance. Such devices have not met with success either because of the back pressure problem or because of their structural complexity, which results in a device which is expensive to manufacture.

The present filter device invention overcomes these and other problems.

SUMMARY OF THE INVENTION

This engine exhaust gas filter is directly insertable into the tail pipe of an automobile exhaust system and provides a simple means of removing contaminants from the exhaust gas of an automobile. The device is sufficiently inexpensive to be made disposable.

It is an important object of this invention to provide a fibrous filtering medium which is disposed about a structurally self-supporting elongate central core attached to an end base member.

Another object is the provision of a cylindrical body formed from glass fibrous material, said body having a diameter greater than the tail pipe diameter in which it is accommodated, said fibrous material being sufficiently loosely woven to avoid blockage of the tail pipe yet being reinforced and held by the central core to facilitate insertion into the tail pipe.

An object of the invention is to provide a base member which includes a screen and a circumferential clamping band for attachment of the filter to the tail pipe.

Yet another object is to provide a central core member having a helical configuration to hold the cylindrical body against lengthwise compression and to facilitate attachment to the base member screen.

A further object of the invention is to provide a removable cellophane cover for the fibrous filtering material, which facilitates handling of said material and insertion of the device into an automobile tail pipe.

It is an object to provide a filtering device which is relatively simple and inexpensive to manufacture and can be installed by anyone without special instructions.

DESCRIPTION OF THE PREFERRED EMBODIMENT

Figure 1:
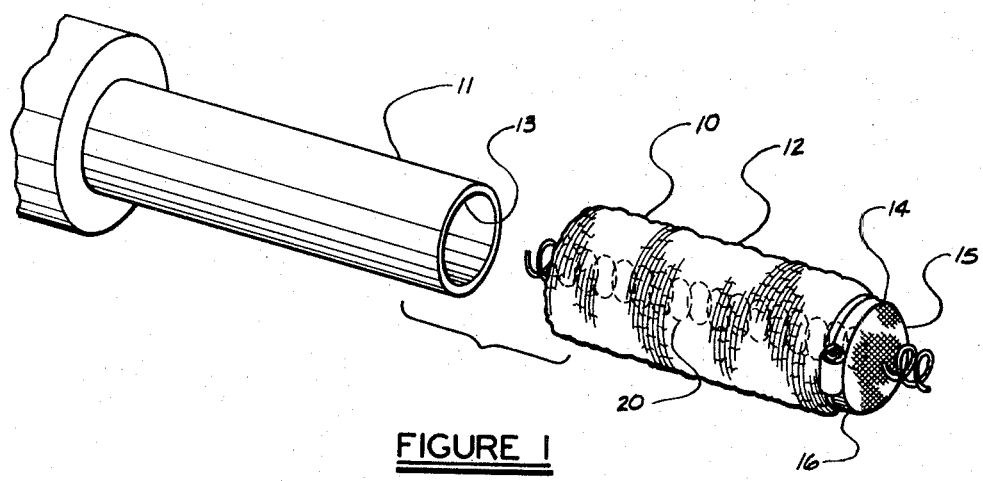
FIG. 1 is a perspective view of the filter prior to insertion into a tail pipe.

Referring now by characters of reference to the drawing and first to FIG. 1 it will be understood that the filter, generally indicated by numeral 10, is intended for insertion within the tail pipe 11 of an automobile exhaust assembly. The filter 10 comprises a generally cylindrical body 12 of filter material such as that known by the trade name of Fiberglas. In the preferred embodiment the diameter of the body is larger than the diameter of the tail pipe opening 13 to ensure that the Fiberglas material extends across the entire tail pipe cross section.

Figures 2, 3, 4:
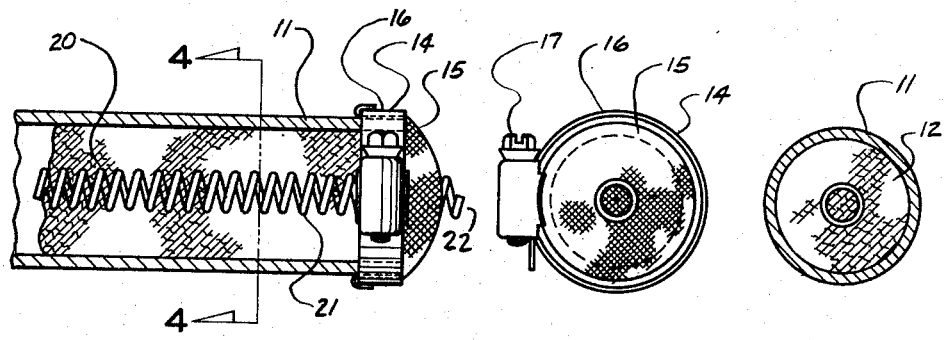
FIG. 2 is a longitudinal sectional view of the filter following insertion.
FIG. 3 is an end view of the filter.
FIG. 4 is a cross sectional view taken on line 4—4 of FIG. 2.

As shown in FIGS. 2 and 3 particularly, the filter 10 includes a base member 14 consisting of a dome-shaped screen portion 15 formed from wire mesh, and a clamp portion, provided by a circumferential band 16 having a tightening screw 17, by which the filter 10 is attached to the tail pipe 11. It will be understood that the structural arrangement of the screen and clamping portions provides a measure of adjustment flexibility such that the base member is suitable for attachment to more than one size of tail pipe.

Importantly, the filter 10 includes a coaxial core member 20 which, in the preferred embodiment, is provided by a length of wire having a helical configuration and extending substantially the length of the cylindrical fibrous body 12. The helical configuration of the core member 20 permits the fibrous body 12 to be "threaded" onto said core member and retained in a longitudinal direction by engagement between the plurality of helical turns 21 and fibrous material of said body 12. As shown particularly in FIG. 2 the end helical turn 22 is threaded through the wire screen 15, which provides a convenient attachment for the core member 20 without the need for fasteners, welding or other attachment means.

Figure 5:
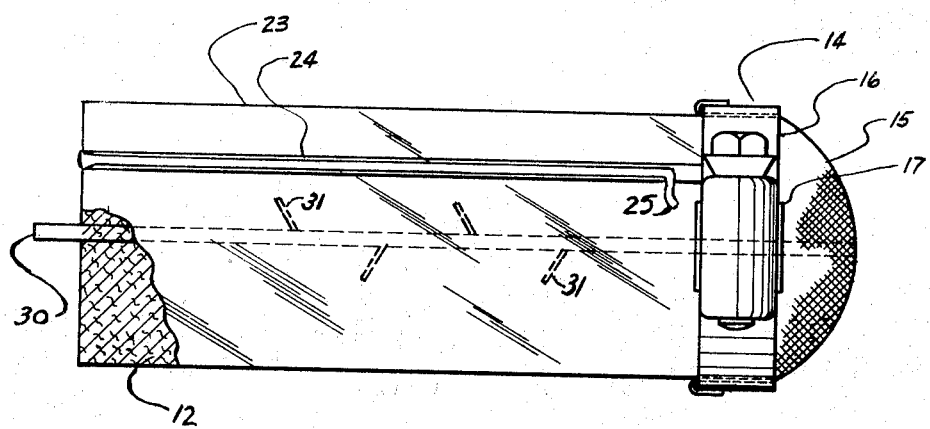
FIG. 5 is an elevational view of a modified device.

FIG. 5 illustrates a modification of the device in which the base member 14 is substantially identical to that of the embodiment described above. However, the core member 30 is substantially straight and is attached to the screen portion of the base member 14 as by welding. The fibrous material can be retained on the core member 30 as by friction, adhesion or projections 31. The fibrous cylindrical body 12 is enclosed in a cellophane cover 23, which includes a doubled-back tear strip 24 having an end pull portion 25 to facilitate its removal from the cylindrical body 12 following substantial insertion of said body into the tail pipe 11. The cellophane cover 23 provides a protective means for the fibrous material to facilitate handling. Further, said cover 23 facilitates the replacement of the fibrous material in a disposable cartridge form, it being understood that the cover provides at least a sleeve and a remote closed end in the preferred embodiment. Alternatively, because of the inexpensive nature of the entire device it can readily be made completely disposable.

Although the cover 23 has been described with reference to a modified device it will be clear that it can also be used with a device having a helical core member.

It is believed that the operation of the device is self-evident in that once installed within the tail pipe 11 particulate contaminants are filtered from the exhaust gas prior to issuance of said gas to atmosphere. Because of the provision of a relatively sturdy reinforcing core member 20 (30) the cylindrical body 12 can be of virtually any length necessary to facilitate filtering operation and yet can be relatively loosely formed about said core member so as not to impede the flow of exhaust gas unnecessarily. The filter 10 thereby substantially obviates back pressure problems.

The diameter of the cylindrical body can be made somewhat larger than the diameter of the tail pipe opening 13, because the core member 20 stiffens said body against collapse the tends to preclude longitudinal compression of said body during insertion. The relatively flexible nature of the fibrous material permits compression in a radial direction and thereby facilitates insertion of the body within the tail pipe 11 up to the point of attachment of the device to said tail pipe by means of the base member clamping band 16.

The provision of a cellophane cover 23 on the device facilitates the manufacture of the filter in disposable form and, in addition, assists in the handling and storage of the device. The cover can be easily removed, prior to the attachment of the device, by simply pulling the tear strip end 25 which projects outwardly of the tail pipe 11.

The use of a helical wire for the core member 20 provides a convenient transverse engagement means for retaining the fibrous body against longitudinal movement, but such transverse engagement could also be achieved as indicated in FIG. 5 by providing a plurality of transverse projections 31.

I claim as my invention:

1. A gas filter for an exhaust pipe comprising:
  a. a body of fibrous filter material having a non-rigid periphery adapted to be received in the exhaust pipe,
  b. a base member at one end of said body including a screen and an exhaust pipe mounting means, and
  c. an elongate core member within said body attached to said base member in cantilever relation and extending substantially the length of said body to support said fibrous material and substantially expose the transverse area of the other end of said body to permit substantially unimpeded longitudinal flow of gas through the fibrous material.

2. A filter as defined in claim 1, in which:
  d. the core member is a helical wire having a plurality of turns holding the fibrous material by transverse engagement therewithin and tending to restrain the body against longitudinal movement along the wire.

3. A gas filter for an exhaust pipe comprising:
  a. a body of fibrous filter material having a generally cylindrical configuration with a non-rigid periphery adapted to be received in radially compressible relation within the exhaust pipe,
  b. a base member at one end of said body including a screen having a plurality of mesh apertures and an exhaust pipe mounting means, and
  c. an elongate helical wire core member attached to said base member and extending substantially the length of said body to support said fibrous material said wire having a plurality of turns holding the fibrous material and tending to restrain the body against longitudinal movement said helical wire being attached to the base member by threading the helical wire through a screen mesh aperture.

4. A gas filter for an exhaust pipe, comprising:
  a. a body of fibrous filter material having a generally cylindrical configuration with a non-rigid periphery adapted to be received in radially compressible relation within the exhaust pipe,
  b. a base member at one end of the body including a wire mesh screen and a circumferentially adjustable clamping band adapted to clamp the base member to the exhaust pipe, and
  c. an elongate core member substantially coaxial and coextensive with said body to support the fibrous material said core member being attached to said base member at one end in cantilever relation in a manner to substantially expose the transverse area of the other end of said body to permit substantially unimpeded longitudinal flow of gas through the fibrous material said core member having transverse engagement portions extending into the fibrous body tending to restrain the body against longitudinal movement along the core member.

* * * * *